(12) United States Patent
Hu

(10) Patent No.: US 8,131,831 B1
(45) Date of Patent: Mar. 6, 2012

(54) CENTRALIZED POLICY MANAGEMENT FRAMEWORK FOR TELECOMMUNICATION NETWORKS

(75) Inventor: Q. James Hu, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1128 days.

(21) Appl. No.: 11/533,302

(22) Filed: Sep. 19, 2006

(51) Int. Cl.
*G06F 15/173* (2006.01)

(52) U.S. Cl. ............... 709/223; 455/406; 455/414.1; 455/452.2; 379/201.03

(58) Field of Classification Search .......... 455/410, 455/414.1, 343.2, 452.2; 707/5; 370/310; 709/225, 226, 229, 231, 223; 379/201.03
See application file for complete search history.

(56) References Cited

U.S. PATENT DOCUMENTS 6,487,594 B1 * 11/2002 Bahlmann .............. 709/225
6,621,895 B1 * 9/2003 Giese .................. 379/201.03
(Continued)

OTHER PUBLICATIONS

U.S. Appl. No. 11/513,100, Q. James Hu.
(Continued)

*Primary Examiner* — Dustin Nguyen

(57) ABSTRACT

A centralized policy management framework, including a centralized policy repository, is provided that can support both services and network management within a wireless network, and supports both Internet Protocol (IP)-based and non IP-based service traffic. Service level agreement (SLA) management and policy exchange is enabled for converged services across network domains. In one non-limiting embodiment, a 3GPP standards-based architecture is integrated into the overall policy management framework.

20 Claims, 11 Drawing Sheets

U.S. PATENT DOCUMENTS

| | | | |
|---|---|---|---|
| 6,738,819 B1* | 5/2004 | Li et al. | 709/229 |
| 7,610,038 B2* | 10/2009 | Tan et al. | 455/410 |
| 7,620,384 B2* | 11/2009 | Cai et al. | 455/406 |
| 7,680,478 B2* | 3/2010 | Willars et al. | 455/343.2 |
| 2002/0147828 A1* | 10/2002 | Chen et al. | 709/231 |
| 2004/0248583 A1* | 12/2004 | Satt et al. | 455/452.2 |
| 2007/0066286 A1* | 3/2007 | Hurtta | 455/414.1 |
| 2007/0100981 A1* | 5/2007 | Adamczyk et al. | 709/223 |
| 2008/0049648 A1* | 2/2008 | Liu et al. | 370/310 |
| 2009/0177650 A1* | 7/2009 | Petersson et al. | 707/5 |
| 2010/0095003 A1* | 4/2010 | Zhao | 709/226 |

OTHER PUBLICATIONS

Moore, B.; Ellesson, E.; Strassner, J.; Westerinen, A. Policy Core Information Model—Version 1 Specification, RFC3060, Feb. 2001.

Hull, R.; Bharat Kumar; Lieuwen, D.; "Towards federated policy management", Policies for Distributed Systems and Networks, 2003. Proceedings. Policy 2003. IEEE 4th International Workshop on Jun. 4-6, 2003 pp. 183-194.

3GPP TS 23.203: "Policy and Charging Architecture", Release 7, V.1.0.0, May 2006.

* cited by examiner

CENTRALIZED POLICY MANAGEMENT FRAMEWORK FOR TELECOMMUNICATION NETWORKS

TECHNICAL FIELD

The subject disclosure relates to a centralized policy management framework for centralized policy management, storage, provisioning and/or administration of policies across the same or different communications network(s).

BACKGROUND

Traditionally, policy management for telecommunication networks has focused mainly on network management. In recent years, however, as wireless networks have migrated towards Internet Protocol (IP)-based service environments, policy management has been gaining increasing importance to telecommunication networks wishing to manage and control those services.

In this regard, today, when a user of a networked portable device, such as a cell phone, PDA, laptop, or the like, request(s) access to one or more services offered via one or more networks, there is no common way to access and apply policy to the user requests. For a similar reason, there is no common way to manage, i.e., store, update, etc., the policies in the system either. Each separate service, or class of services, today requires the network to apply different policy mechanisms depending on the kind of request being handled.

For instance, as shown in FIG. 8, where a user makes a request via a portable device 800 for short messaging services (SMS) via network(s) 810, the user's request today is forwarded to a policy management subsystem 820 coupled to policy storage 822 for storing SMS policies of the network. In this regard, the policy management subsystem 820 and SMS policy storage 822 are customized for SMS policies and rules for enforcing those SMS policies. Similarly, where a user might make a request for Internet service via network(s) 810, the user's request is referred to a policy management subsystem 830 coupled to policy storage 832 for storing rules applying to Internet usage. The policy management subsystem 830 and Internet policy storage 832 are customized for Internet policies and rules for enforcing those SMS policies.

Since the rules are customized for particular classes of services, the rule subsystems cannot be re-used for new classes of services, and do not interoperate with one another easily. Moreover, in addition to storage 822 and 832 being stored at different locations, and according to different formats, different rule definitions, etc., storage 822 or 832 might each themselves be stored in a distributed manner, storing policy information across a network at various different nodes and locations. Thus, management of this policy information, even within the same network, presents difficult issues.

As yet another example, the user might make another request for Location services, which may be offered on second network(s) 812 via network(s) 810, e.g., as in the roaming case for disparate network domains. In such a case, the user's request is referred to yet another policy management subsystem 840 accessible only via second network(s) 812, which is coupled to yet another policy storage 842 for storing rules applying to Location services usage on second network(s) 812. The policy management subsystem 840 and Location policy storage 842 are customized for Location policies and rules for enforcing those Location policies.

It would be desirable to transmit one or more policies pertaining to the user from somewhere within the domain of network(s) 810 to network(s) 812 so that policies can be used interchangeably between the networks. However, today, the policy management subsystems 820 and 830 simply do not communicate such policy information between networks due to the above-described complexity associated with numerous ever-evolving classes of services, each implementing custom policy management and storage for dynamic and static policies.

Thus, currently, these policy management functions are scattered within mobile networks. These ad hoc implementations of policy functions lead to policy conflicts, driving up operating expenses (OPEX) and complexity. Today, due to such customized and distributed storage, management and application of policies for different classes of services, policy management is not applied in a coherent manner.

As the number of classes of services proliferates, the problems presented by the lack of centralized policy repository and management system increase exponentially. Furthermore, there is no existing mechanism to exchange policy information from such a centralized repository for roamers on a network, so that a user's policy information can be accessible, in aggregate, for all of the services to which a user can subscribe across a variety of disparate networks.

These and other deficiencies in the state of the art of network traffic policy management and storage will become apparent upon description of the various exemplary non-limiting embodiments of the invention set forth in more detail below.

SUMMARY

In exemplary, non-limiting embodiments, the invention provides a centralized policy management framework, including a centralized repository for policy, which can support both services and network management within a wireless network. In various non-limiting embodiments, the invention supports both IP-based and non IP-based service traffic, as well as service level agreement (SLA) management and policy exchange for converged services across network domains. In one non-limiting embodiment, the invention implements and adapts a standards-based architecture into the overall framework.

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments of the invention in a simplified form as a prelude to the more detailed description that follows.

BRIEF DESCRIPTION OF THE DRAWINGS

The system and methods for providing centralized policy enforcement, management, provisioning and/or storage in accordance with the invention are further described with reference to the accompanying drawings in which.

DETAILED DESCRIPTION OVERVIEW

Figure 1:
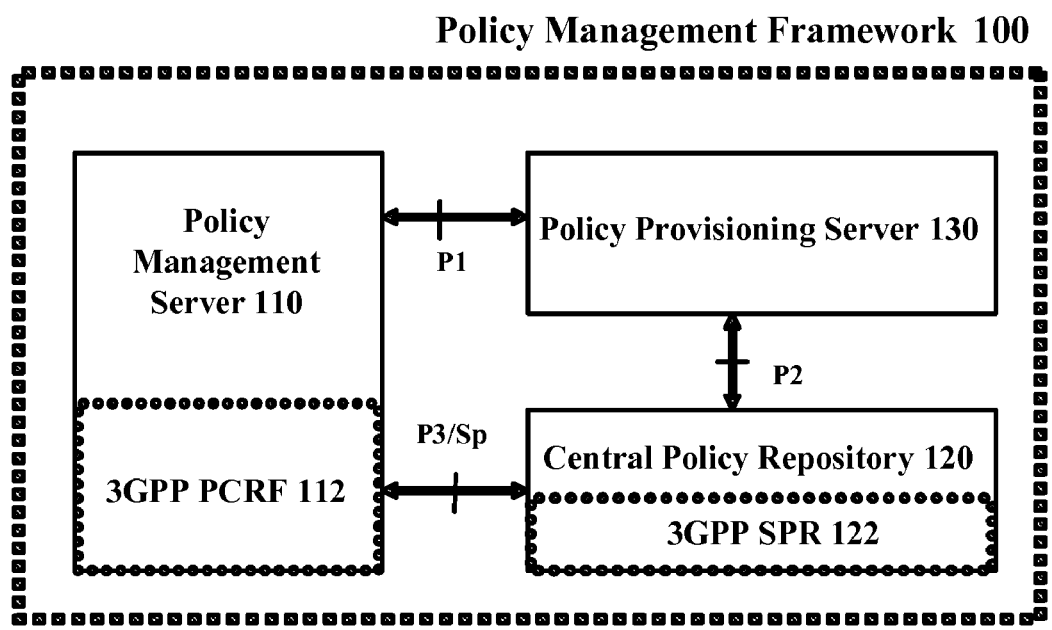
FIG. 1 is a block diagram illustrating an exemplary centralized policy management framework in accordance with the invention.

As mentioned in the background, with telecommunication networks evolving in the direction of IP-based services and traffic moving towards an all IP environment, the migration of network intelligence towards the "edge" of the networks via IP addressing capabilities is having a significant impact on operators' ability to manage and control their networks in terms of providing intelligent, integrated services. In this regard, policy management has emerged as a powerful tool to help operators to manage and control IP/IMS service networks.

However, as alluded to in the background, customized and distributed storage, management, application, etc. of policies for different classes of services in current networked environments is making policy management and storage overly complex, especially where policies are numerous, complex and change frequently.

Accordingly, in various non-limiting embodiments of the invention, a centralized Policy Management Framework (PMF), or architecture, is provided for a mobile network. In an exemplary, non-limiting implementation of the invention, storage, management and provisioning of policies are predicated at least in part on a policy standard.

In one non-limiting implementation of the invention described in more detail below, the policy standard may be the technical specification defined by the 3rd Generation Partnership Project's (3GPP's) Technical Specification Group Services and System Aspects, entitled "Policy and Charging Control Architecture; Release 7" and identified as "3GPP TS 23.203 V1.0.0 (2006-05)" (the "3GPP R7 PCC" specification), which is incorporated herein by reference in its entirety.

In various non-limiting embodiments of the invention, the policy decision function (PDF) of the architecture is provided as an independent "enabler," which also establishes a centralized policy repository for centralized storage of user policy. In other exemplary, non-limiting implementation of the invention, various mechanisms and methods are provided for using the PMF to policy enable converged services across operator domains. These and other/additional non-limiting aspects of the invention are described in more detail in connection with the below description of exemplary non-limiting embodiments of the invention.

Centralized Storage, Management and Provision of Policy

As alluded to above, as telecommunication networks evolve toward IP-based services, effective management of the network services becomes very challenging both in terms of managing IP/IP Multimedia Subsystem (IMS) services in a network and in terms of converging those services with services from other networks. Accordingly, the invention provides a centralized policy management framework (PMF) as an effective tool to help mobile operators to manage services and network resources. Exemplary non-limiting designs for the PMF are presented for various non-limiting embodiments of the invention below. For instance, in an exemplary, non-limiting implementation of the invention, various mechanisms and methods are provided for using the PMF to policy enable converged services across operator domains.

Thus, the invention provides a framework that can be deployed in the wireless network to support policy modeling and centralized policy management as an independent enabler to "unify" policy related functions where they have been distributed in the past. Furthermore, the PMF is able to manage service level agreements (SLAs) and communicate with other policy functions in other domains for both converged services and roaming scenarios.

In an exemplary non-limiting implementation of the invention, a policy management framework is provided that works for both IP flow based as well as non flow-based services and applications. In one non-limiting implementation, the IP flow based policy management is based on the 3GPP R7 PCC specification. The centralized PMF of the invention thus goes beyond the traditional realm of policy management as an independent enabler for mobile service management that can use SLAs and policies to "broker" services to converge policy application across different networks. In more detail below, various non-limiting design details and considerations for the PMF of the invention are presented followed by some optional uses of the PMF to enable converged services across disparate networks.

Policy Management Framework

Policy is a very generic and widely interpreted word with many different definitions and meaning. Accordingly, for the avoidance of doubt, herein "policies" refer to a set of one or more rules that a network operator can define and enforce in a telecommunications network. In accordance with various non-limiting embodiments of the invention, these policies can be exchanged and applied both within an operator domain and across different operator domains.

In this regard, there are two sets of policy related service management issues that operators face: (1) how to manage all services within a mobile network as the mobile network migrates towards an all IP environment making existing infrastructures obsolete and (2) how to manage end-to-end services that traverse different network domains.

In consideration of the need for management of both network(s) and service(s), the invention provides a centralized PMF, which is a platform for centrally managing all policies not only related to network management, but also services that ride on the network resources. The PMF of the invention manages policies in a unified and consistent manner so that a network operator has the ability to provision, validate and correlate policies in a centralized manner. This improves efficiency and consistency since only one mechanism provides policies, thereby reducing duplication of policy storage as well as conflicts with other unknown policy administered from somewhere else in the network.

Furthermore, the PMF of the invention is optionally provided as an independent horizontal enabler, thus enabling ubiquitous policy management services for all future services, which may also wish to implement policy control and management functions. As mentioned, in one exemplary non-limiting aspect, the PMF of the invention may support service and network management and control within an operator's network. In another non-limiting aspect, the PMF of the invention may be provided as a policy framework to support roaming, e.g., in wireless/wire line/Internet three way convergence scenarios.

In exemplary non-limiting embodiments of the invention, the PMF supports many different types of services across a broad service spectrum. Examples of service types include, but are not limited to any one or more of the following: Integrate services (e.g. integrated voice and data services), Presence and Location, Instant Messaging/Chat, Voice Over IP (VoIP), Convergence (e.g., service across different types of networks) and/or other known or future developed services that may benefit from the PMF of the invention.

Exemplary Non-Limiting Embodiments

As mentioned, in accordance with the invention, the PMF is defined for an operating environment for a mobile operator in terms of the new services that will be enabled by the deployment of 3G network. How to optimize network resources is also handled at the same time as policy is applied for the network services. In addition, the PMF can optionally support existing systems, and enable migration from existing systems to the PMF, by providing interfaces for defining a policy subsystem for a class of services.

In various non-limiting embodiments, the PMF architecture of the invention is a unified and independent network enabler. The PMF may be implemented to be access technologies agnostic, so that policy can be applied independently of the end point technology used to access the network. The PMF may be standards-based and deployable to and by a wide range of parties. The PMF may support SLA management to operate effectively in a converged service management. The PMF may support both IP and non-IP flow based services with a common policy architecture and centralized storage abstraction. The PMF may support an interface to a PMF in other operator domains so that effective and efficient sharing and/or comparing of policy information can be performed between networks according to a common framework.

In addition, in various non-limiting embodiments of the invention, policy decision and policy enforcement functions may be separated so the decision function is also centralized, i.e., policy decisions can be changed, updated, shared, accessed, stored, etc. independently of the enforcement of the policies. This separation also allows for a centralized policy repository. This flexibility also enables the PMF system to be interoperable with various enforcement elements, so that all policy enforcement is handled from a centralized location in the system.

Any middle elements between a policy decision point (PDP) and a policy enforcement point (PEP) are also avoided whereby, where possible, functions may be collapsed into single logical elements to avoid unnecessary signaling between functional elements, so that the centralized abstraction operates as efficiently as possible, taking advantage of its role as a centralized authority for policy.

In various non-limiting embodiments, the PMF may support policy-based content filtering and other application-level policy control policies. The PMF system may also support policy decisions based on both subscription and dynamic service policies, such as location, device type, user presence, and time of the day. The PMF may also handle charging rules and interact with charging functions. The PMF may also manage both network security and data service security.

In addition, as mentioned, the PMF provides a migration path for converging localized or "customized by class of service" policy functions into the centralized management framework of the invention.

Accordingly, in various non-limiting embodiments, as shown in FIG. 1, the PMF architecture 100 of the invention includes, but is not limited to three main components: a policy management server (PMS) 110, a policy provisioning server (PPS) 130 and a central policy repository 120. As utilized herein, process P1 refers to interface communications between PMS 110 and PPS 130, P2 refers to interface communications between PPS 130 and CPR 120, and P3/Sp refers to interface communications between CPR 120 and PMS 110/SPR 112 and PCRF 112.

In various non-limiting embodiments, PMS 110 acts as a Policy Decision Function (PDF) and also a policy manager for managing predefined network operator policies, such as policy validation, redundancy check, policy chaining, access control for provisioning server, etc. PMS 110 may be implemented as, or include, a policy control and charging rules function (PCRF) 112 as defined in the 3GPP R7 PCC specification. In various non-limiting embodiments, PPS 130 is responsible for policy provisioning, including syntax check, policy parsing and cataloging, policy conflict resolution, precedence setting, SLA management, and the like. Central policy repository 120 stores all policy data as a centralized storage abstraction, i.e., centralized from the perspective of requesting applications and services even if some of the data is referenced. Central policy repository 120 may be implemented as, or include, a subscription profile repository (SPR) 122 as defined in the 3GPP R7 PCC specification.

Converged Services Across Disparate Network Domains

As alluded to earlier, the PMF of the invention also addresses cross-network issues as well. In this regard, intense competition in the telecommunications market has put a premium on converged services to provide the most competitive set of network offerings. This creates a need to provide services across network boundaries, such as fixed and mobile network convergence. However, providing such services is challenging for two main reasons: one is that networks have not yet fully converged in terms of all IP-based services. The other is that even if all networks are IP-based, each operator has to have full control of its own network thus making it practically impossible to control end to end (i.e., cross domain) traffic quality in any meaningful way.

Another aspect of convergence is roaming, which involves not only user plane traffic routing, but also services that people need to use when they roam. Currently, most of the services are routed back to the home network and there is no mechanism for the roamer to utilize services directly using a visited network while maintaining his/her service continuity.

Accordingly, the PMF of the invention can be used to manage converged services scenarios because the policies that control resources can be negotiated and exchanged between networks because all policy data is centrally located. In this regard, in various non-limiting embodiments, the invention can be used according to any one or more of the following four converged services scenarios:

The first scenario relates to backhauling all services to home network, using the publicly switched telephone network (PSTN) for voice interconnects. This is the current situation for inter-domain communication, such as roaming and converged services. The second scenario relates to IP Multimedia Services (IMS) where the service parameters, such as Quality of Service (QoS), are exchanged using the session definition protocol (SDP). A third scenario not yet realized is to use policy services, such as the PCRF as defined by 3GPP to exchange service policies directly between a home network and visited network. The fourth scenario not yet realized is the use of SLA management tools in the PMF to handle and negotiate services related to parameters between partners.

Figure 2:
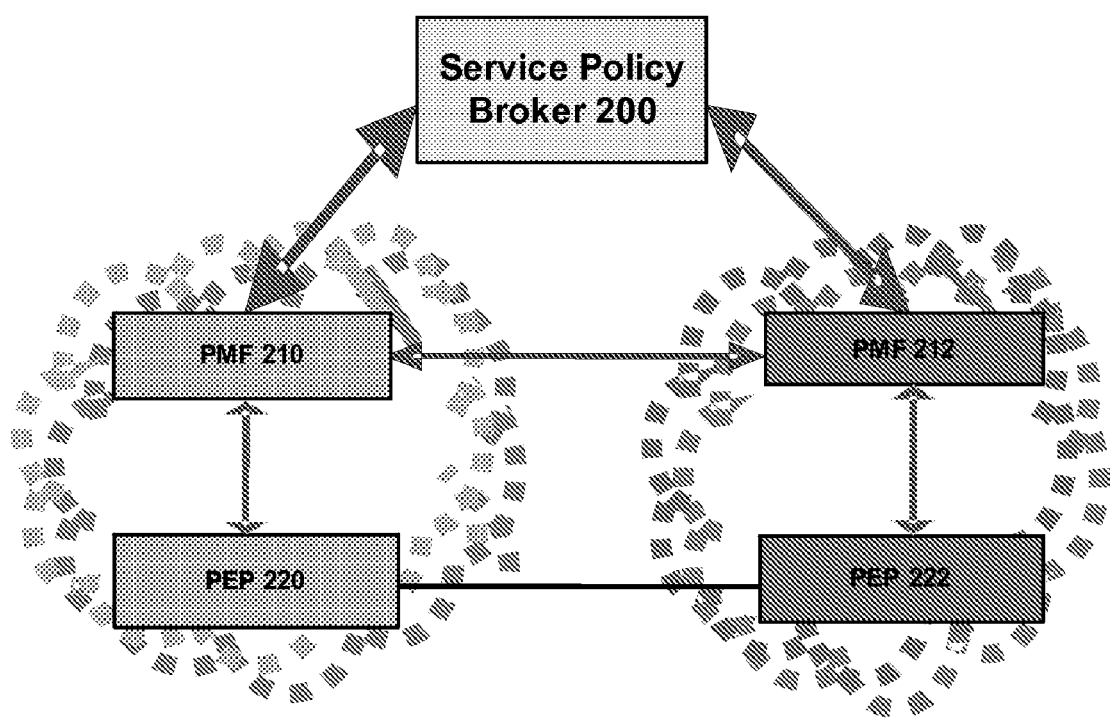
FIG. 2 is a block diagram illustrating exemplary cross network convergence enabled by centralized policy management frameworks for a plurality of networks in accordance with the invention.

In one embodiment of the invention, a third party policy service broker mechanism is provided for multi-party, multi service convergence, as shown in FIG. 2. FIG. 2 shows that the PMF of the invention can be deployed in each operator domain, e.g., as PMF 210 and PMF 212, respectively. Together, PMF 210 and PEP 220 operate according to the invention for a first network and PMF 212 and PEP 222 operate according to the invention for a second network. The PMFs 210 and 212 can use some common interfaces, such as the simple object access protocol (SOAP), to negotiate services parameters directly between partners via SLA management tools. Similarly, PEPs 220 and 222 can also exchange enforcement policy information across networks.

Using the SLA mechanism thus enables dynamic negotiation of service policies, which gives flexibility to each operator to implement their own policy framework as long as they have a standard interface, provided in accordance with the invention, for exchanging service and network policy information. The SLA mechanism also gives each operator the ability to apply business logic and charging information, so that they too can be reflected in the policies being exchanged.

As the number of partners grows, another embodiment of the invention considers the possibility of establishing a third party service policy broker 200 as shown in FIG. 2 to "broker" services between parties. With such an arrangement, each party has one interface with the broker to negotiate SLAs, without requiring multiple interfaces to multiple different parties. More than two parties can be supported by the policy broker 200 to facilitate the process of exchanging information and negotiating agreements between parties In one non-limiting embodiment of the invention, the policy broker 200 is operator neutral and connects to each operator's policy management framework (PMF) 210, 220, etc., via a standard SOAP interface. This reduces implementation costs and provides a standard mechanism to exchange information across different operator domains. It is also possible for the policy broker 200 to dynamically translate and map policies from different operators with information provided by an SLA when a service is contracted.

Accordingly, the invention provides a centralized policy management framework that can support both services and network management within a wireless network and that supports SLA management and policy exchange for converged services across network domains.

Figure 3:
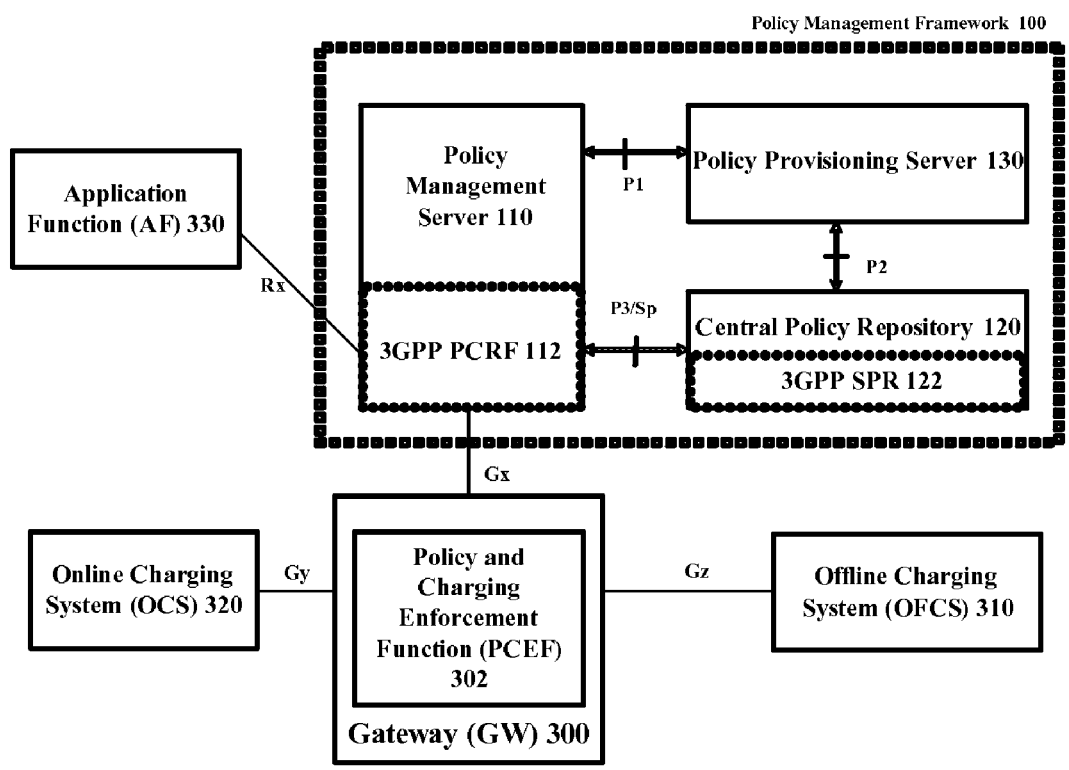
FIG. 3 is a block diagram illustrating an exemplary, non-implementation of the invention integrating a 3GPP standard in accordance with the invention.

As mentioned, in one embodiment, the PMF works seamlessly with the 3GPP R7 PCC architecture, as shown in FIG. 3, to help encourage widespread adoption of the PMF, however, the invention is not limited to such an architecture. In this respect, the 3GPP R7 PCC is merely one optional way to interface to a centralized policy management server 110, i.e., the 3GPP PCRF 112 may be just one of many subsystems that provide a centralized policy management server 110 for a network domain's requirements.

Application Function (AF) 330 is an element offering applications that require dynamic policy and/or charging control over the IP-Connectivity Access Network (IP-CAN) user plane behavior. AF 330 may receive an indication that the service information is not accepted by a PCRF 112 together with service information that the PCRF 112 would accept. In that case, AF 330 rejects the service establishment towards the user equipment (UE). If possible, AF 330 forwards the service information to the UE that the PCRF 112 would accept. AF 330 may communicate with multiple PCRFs 112 and contacts the appropriate PCRF 112 based on either the end user IP Address and/or a UE identity of which the AF 330 is made aware.

The Subscription Profile Repository (SPR) logical entity 122 includes all subscriber/subscription related information needed for subscription-based policies and IP-CAN bearer level charging rules by the PCRF 112. The SPR 122 may be combined with or distributed across other databases in the operator's network. SPR 122 may provide the following information, including but not limited to: Subscriber's allowed services, Information on subscriber's allowed QoS, Subscriber's charging related information, and Subscriber category.

The On-line charging system (OCS) 320 may trigger the PCEF 302 to initiate an IP-CAN bearer service termination at any point in time. There may be several OCSs 320 in a Public Land Mobile Network ("PLMN"). A default implementation of addresses for an OCS 320, i.e., the primary and secondary addresses, locally pre-configures the PCEF 302. OCS addresses may also be passed once per IP-CAN session from the PCRF 112 to the PCEF 302.

There may also be several Offline Charging Systems (OFCSs) 310 in a PLMN. In one embodiment, default OFCS addresses (i.e. the primary address and secondary address) are locally pre-configured within the PCEF 302. OFCS addresses may also be passed once per IP-CAN session from the PCRF 112 to the PCEF 302.

The Rx reference point resides between the AF 330 and the PCRF 112. This reference point enables transport of application level session information from AF 330 to PCRF 112. Such information includes, but is not limited to IP filter information to identify the service data flow for policy control and/or differentiated charging and Media/application bandwidth requirements for QoS control.

The Gx reference point resides between the policy and charging enforcement function (PCEF) 302 residing on the gateway (GW) 302 and the PCRF 112. The Gx reference point enables PCRF 112 to have dynamic control over the PCC behavior at a PCEF 302. The Gx reference point enables the signaling of PCC decisions, which govern the PCC behavior, supporting, but not limited to, the following functions: (1) Initialization and maintenance of connection, (2) Request for PCC decision from PCEF 302 to PCRF 112, (3) Provision of PCC decision from PCRF 112 to PCEF 302 and (4) Indication of IP-CAN bearer termination (from PCEF 302 to PCRF 112).

The Sp reference point lies between the SPR 122 and the PCRF 112. The Sp reference point allows the PCRF 112 to request subscription information related to the IP-CAN transport level policies from the SPR 122 based on a subscriber ID and possible further IP-CAN session attributes. The reference point allows the SPR 122 to notify the PCRF 112 when the subscription information has been changed if the PCRF 112 has requested such notifications.

The Gy reference point resides between the OCS 320 and the PCEF 302. The Gy reference point allows online credit control for service data flow based charging. The functionalities required across the Gy reference point may use existing functionalities and mechanisms.

The Gz reference point resides between the PCEF 302 and the OFCS 310. The Gz reference point enables transport of service data flow based offline charging information.

Accordingly, as shown in FIG. 2, the PMF architecture can seamlessly include an implementation of the 3GPP R7 PCC architecture with standard interfaces Rx, Gx, and Sp, reducing implementation costs and interoperability problems. The policy management server 110 can thus be folded into the 3GPP PCRF 112. The PMF 100 of the invention is flexible and can operate in multiple modes that will support different network defined operating environments.

This ability for the centralized PMF of the invention to operate in multimode allows maximum flexibility in deployment so that diverse sets of requirements can be met. In one embodiment, the PMF of the invention can be in one of three modes: (1) as a fully compliant architecture to the 3GPP R7 PCC architecture (FIG. 3 described above) (2) as a PDP to a policy enabled PEP (FIG. 4) and/or (3) as a centralized policy management framework for other policy servers (FIG. 5). Each of the latter two modes is described in turn as follows.

Figure 4:
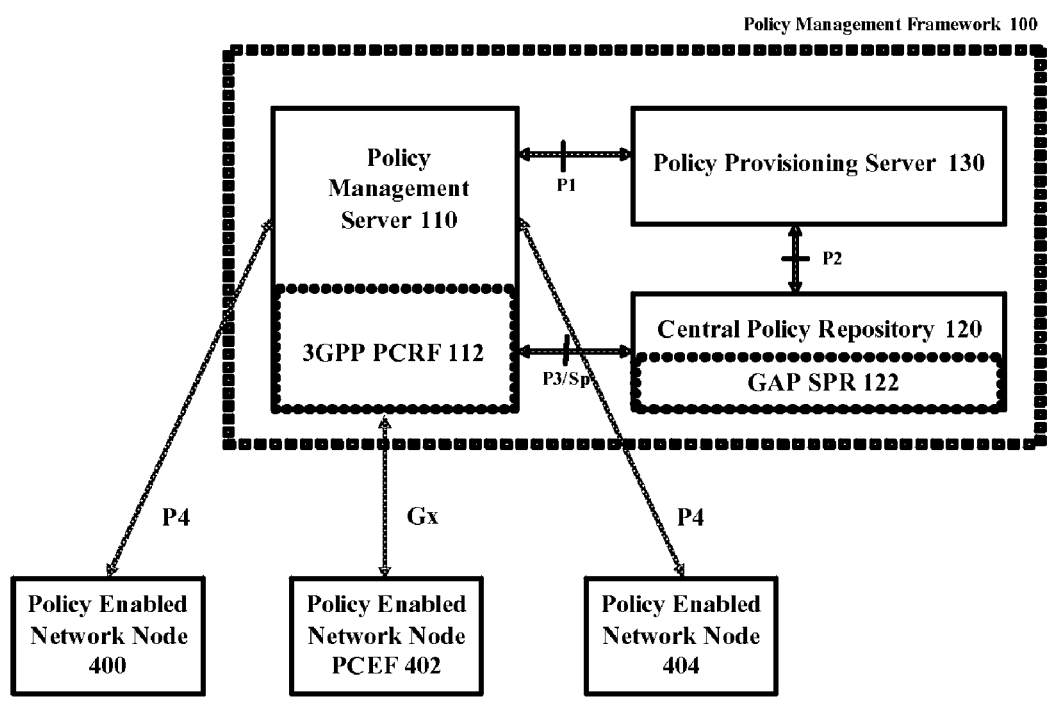
FIG. 4 is a block diagram illustrating an exemplary non-limiting embodiment of the centralized policy management framework of the invention for handling IP-based service traffic and/or non IP-based service traffic in accordance with the invention.
Figure 5:
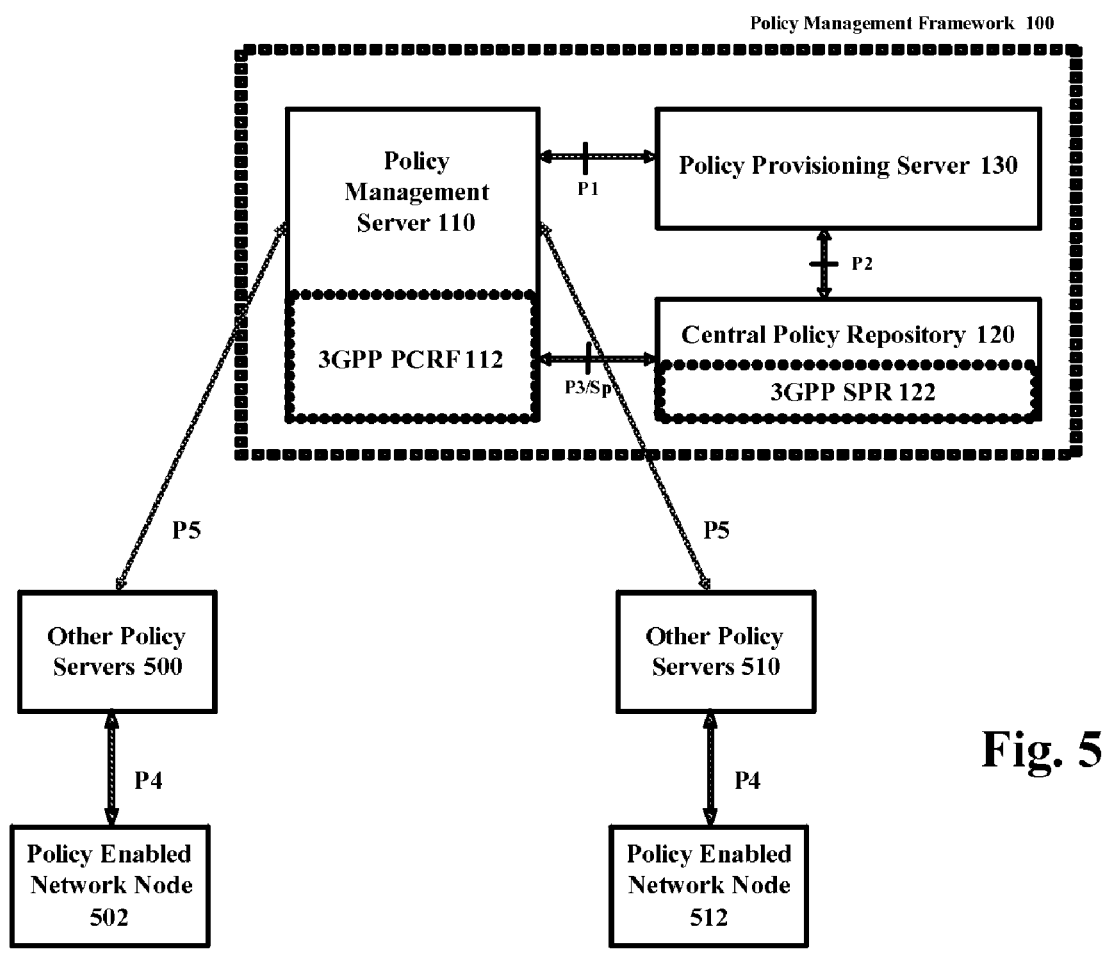
FIG. 5 is a block diagram illustrating an exemplary non-limiting embodiment of the centralized policy management framework of the invention for interfacing with other policy enabled network nodes via other policy servers in accordance with the invention.

As shown in FIG. 4, when behaving as a PDP to a policy enabled PEP, the PMF 100 operates to support non-IP flow based network elements such as nodes 400 and 404, which do not communicate via the IP-flow based 3GPPR7 PCC architecture. In addition, as shown, the invention can be used to support both IP-flow based services (Internet traffic) and non IP-flow based services (such as SMS) by implementing PCRF 112 as a sub-system of an overall policy management server 110. Accordingly, PMS 110 can handle policy management for services not handled by PCRF 112.

FIG. 5 illustrates a centralized PMF 110 of the invention interfacing with other policy enabled network nodes, such as nodes 502 and 512 via other policy servers 500 and 510, respectively. Accordingly, FIGS. 4 and 5 illustrate two alternative modes under which the PMF of the invention may operate, whether applied to other policy-enabled networks within a domain, or across separate domains. In this regard, P4 refers to interface communications between any policy server 110 of the invention and any policy enabled network node (e.g., 400, 404, 502, 512) and P5 refers to interface communications between any two policy servers of the invention (e.g., 110, 500, 510).

Figure 6:
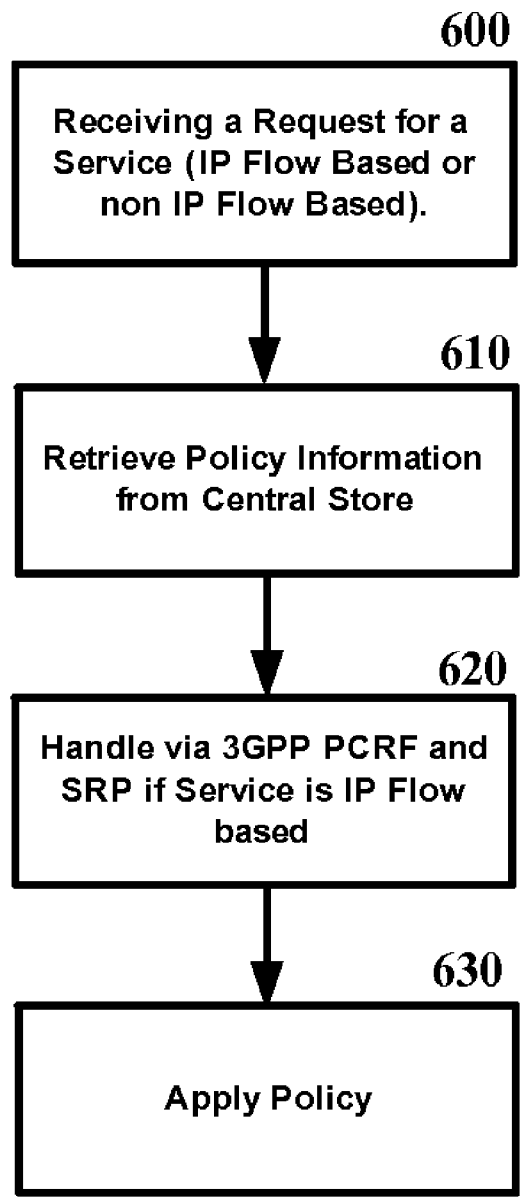
FIGS. 6 and 7 are flow diagrams illustrating exemplary non-limiting processes for handling requests for services in one or more wireless communications networks based on the application of policy by the centralized policy management framework of the invention.

FIG. 6 is a flow diagram illustrating an exemplary non-limiting process for handling requests for services in a wireless communications network based on the application of policy by the centralized policy management framework of the invention. At 600, the network receives a request for a service. As described above, the request can be IP flow based or non-IP flow based. At 610, policy information is retrieved from a central policy store of the wireless communications network. At 620, if the service is IP flow based, the service is handled via a PCRF PMS and a SRP repository of the 3GPP R7 PCC technical specification. Then, at 630, the policy information is applied.

Figure 7:
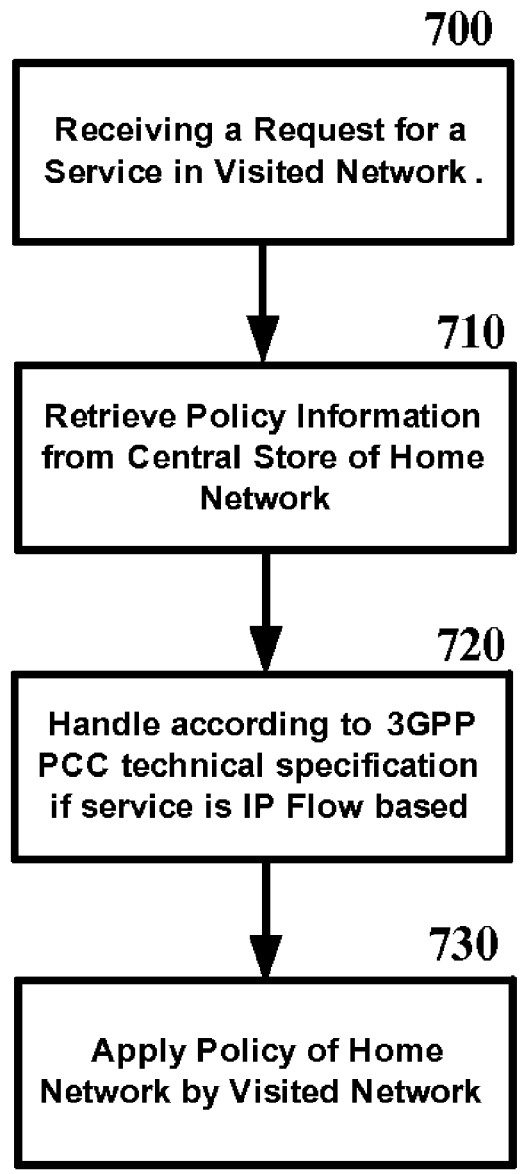
Figure 8:
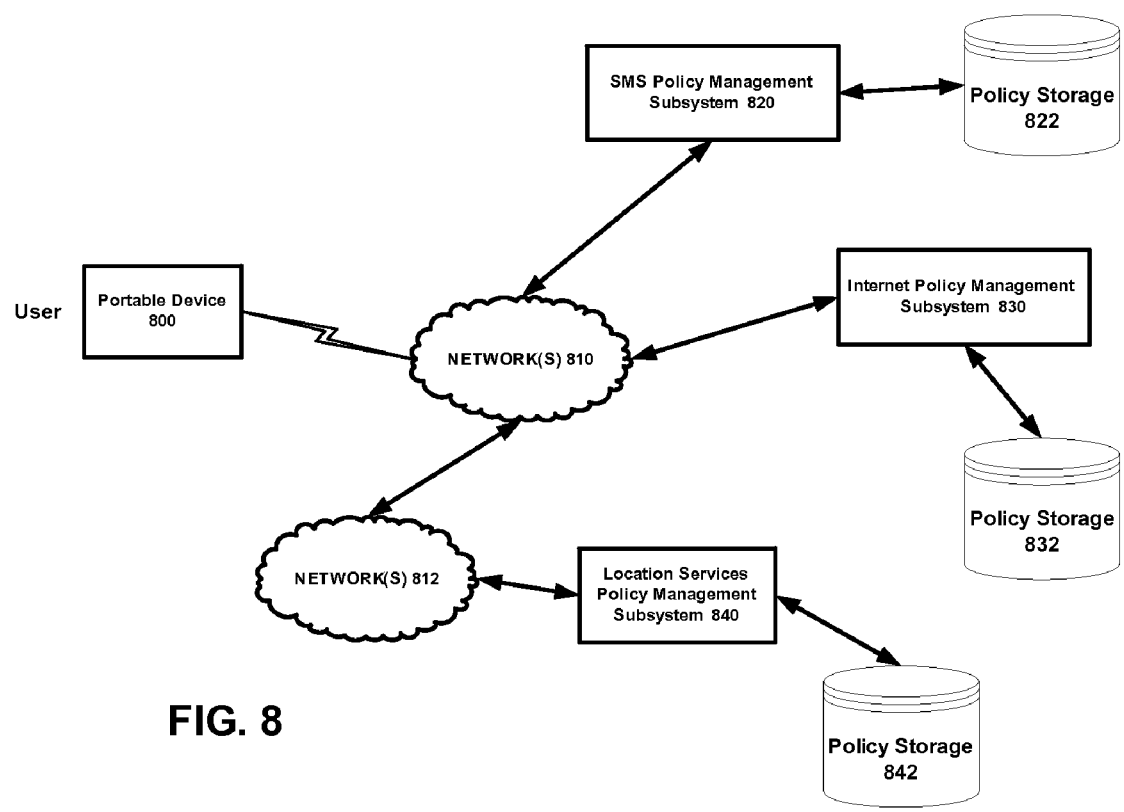
FIG. 8 illustrates an overview of distributed management and storage of policy information across a variety of classes of services in a network environment.

FIG. 7 is a flow diagram illustrating an exemplary non-limiting process for handling requests for services in a wireless communications network based on the application of policy by the centralized policy management framework of the invention. At 700, a visited network receives a request for a service. As described above, the request can be IP flow based or non-IP flow based. At 710, policy information is retrieved from a central policy store of a home network for the service via a policy management server of the home network. At 720, if the service is IP flow based, the service is handled via a 3GPP PCRF PMS and a SRP repository. Then, at 730, the policy information of the home network is applied by the visited network.

As described above, the PMF can manage both IP flow based services (3GPP R7 PCC standard) and non-IP flow based services. The PMF of the invention thus enables synchronization of policy control, within or across networks, reducing operating costs and resolving policy conflicts. The centralized policy repository eliminates duplication of policies and inconsistency of policies within a network.

Accordingly, the policy management mechanisms of the invention link policy for services and networks, via a centralized policy repository, and in one embodiment, integrates seamlessly with a network policy management standard, thereby providing a flexible and multi-mode architecture that is adaptive to the complexities of a mobile network.

Exemplary Networked and Operating Environments

The above-described embodiments of a PMF in accordance with the invention may be applied to any network, however, the following description sets forth some exemplary telephony radio networks and non-limiting operating environments for operation of the PMF of the present invention. The below-described operating environments should be considered non-exhaustive, however, and thus the below-described network architecture merely shows one network architecture into which the present invention may be incorporated. One can appreciate, however, that the invention may be incorporated into any now existing or future alternative architectures for communication networks as well.

The global system for mobile communication ("GSM") is one of the most widely utilized wireless access systems in today's fast growing communication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1× Evolution Data Optimized ("EVDO"), Code Division Multiple Access-2000 ("cdma2000 3×"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and does not depend on any particular network architecture, or underlying protocols.

Figure 9:
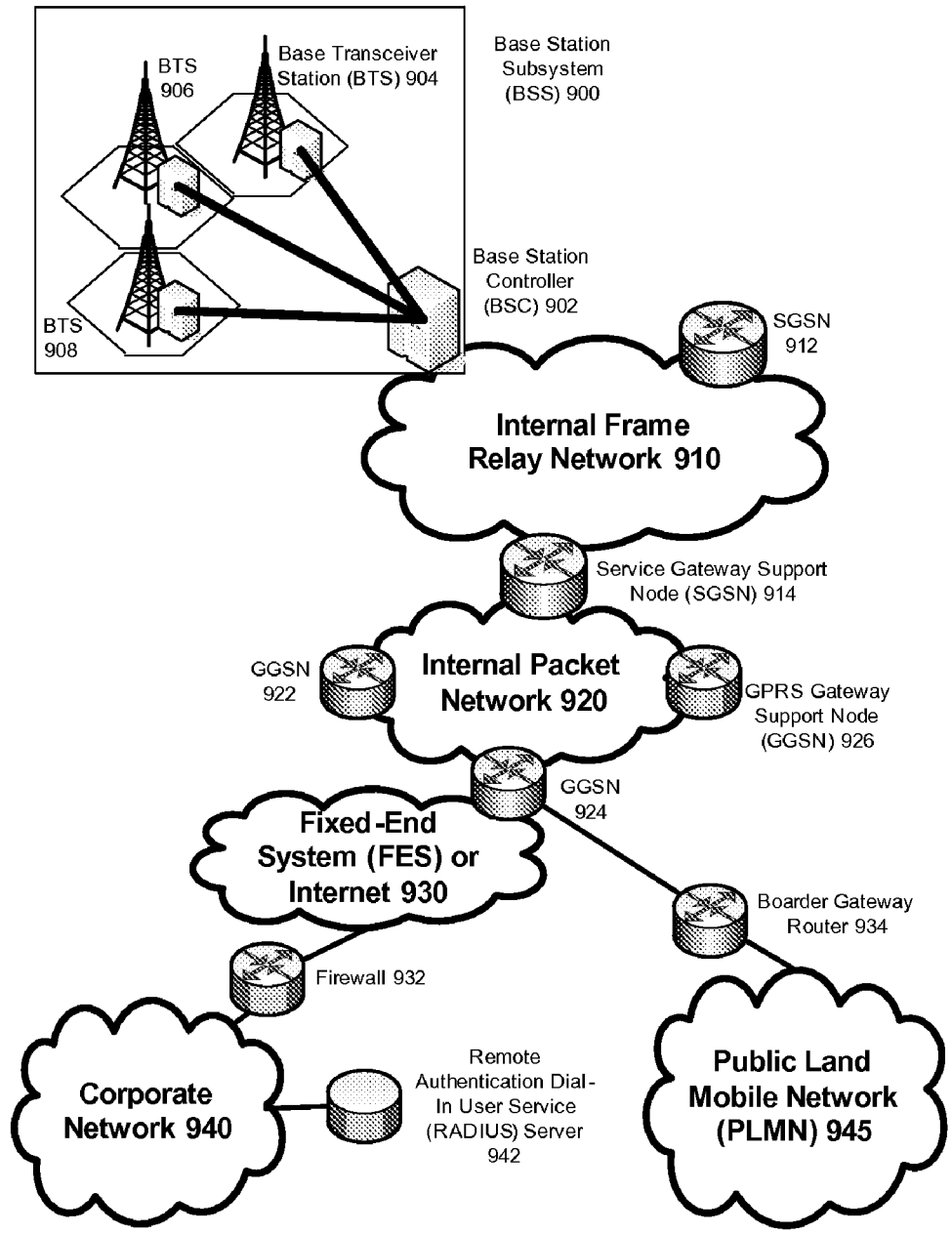
FIG. 9 illustrates an overview of a network environment suitable for service by embodiments of the invention.

FIG. 9 depicts an overall block diagram of an exemplary packet-based mobile cellular network environment, such as a GPRS network, in which the invention may be practiced. In such an environment, there are a plurality of Base Station Subsystems ("BSS") 900 (only one is shown), each of which comprises a Base Station Controller ("BSC") 902 serving a plurality of Base Transceiver Stations ("BTS") such as BTSs 904, 906, and 908. BTSs 904, 906, 908, etc. are the access points where users of packet-based mobile devices become connected to the wireless network. In exemplary fashion, the packet traffic originating from user devices is transported over the air interface to a BTS 908, and from the BTS 908 to the BSC 902. Base station subsystems, such as BSS 900, are a part of internal frame relay network 910 that may include Service GPRS Support Nodes ("SGSN") such as SGSN 912 and 914. Each SGSN is in turn connected to an internal packet network 920 through which a SGSN 912, 914, etc. can route data packets to and from a plurality of gateway GPRS support nodes (GGSN) 922, 924, 926, etc. As illustrated, SGSN 914 and GGSNs 922, 924, and 926 are part of internal packet network 920. Gateway GPRS serving nodes 922, 924 and 926 mainly provide an interface to external Internet Protocol ("IP") networks such as Public Land Mobile Network ("PLMN") 945, corporate intranets 940, or Fixed-End System ("FES") or the public Internet 930. As illustrated, subscriber corporate network 940 may be connected to GGSN 924 via firewall 932; and PLMN 945 is connected to GGSN 924 via boarder gateway router 934. The Remote Authentication Dial-In User Service ("RADIUS") server 942 may be used for caller authentication when a user of a mobile cellular device calls corporate network 940.

Generally, there can be four different cell sizes in a GSM network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Figure 10:
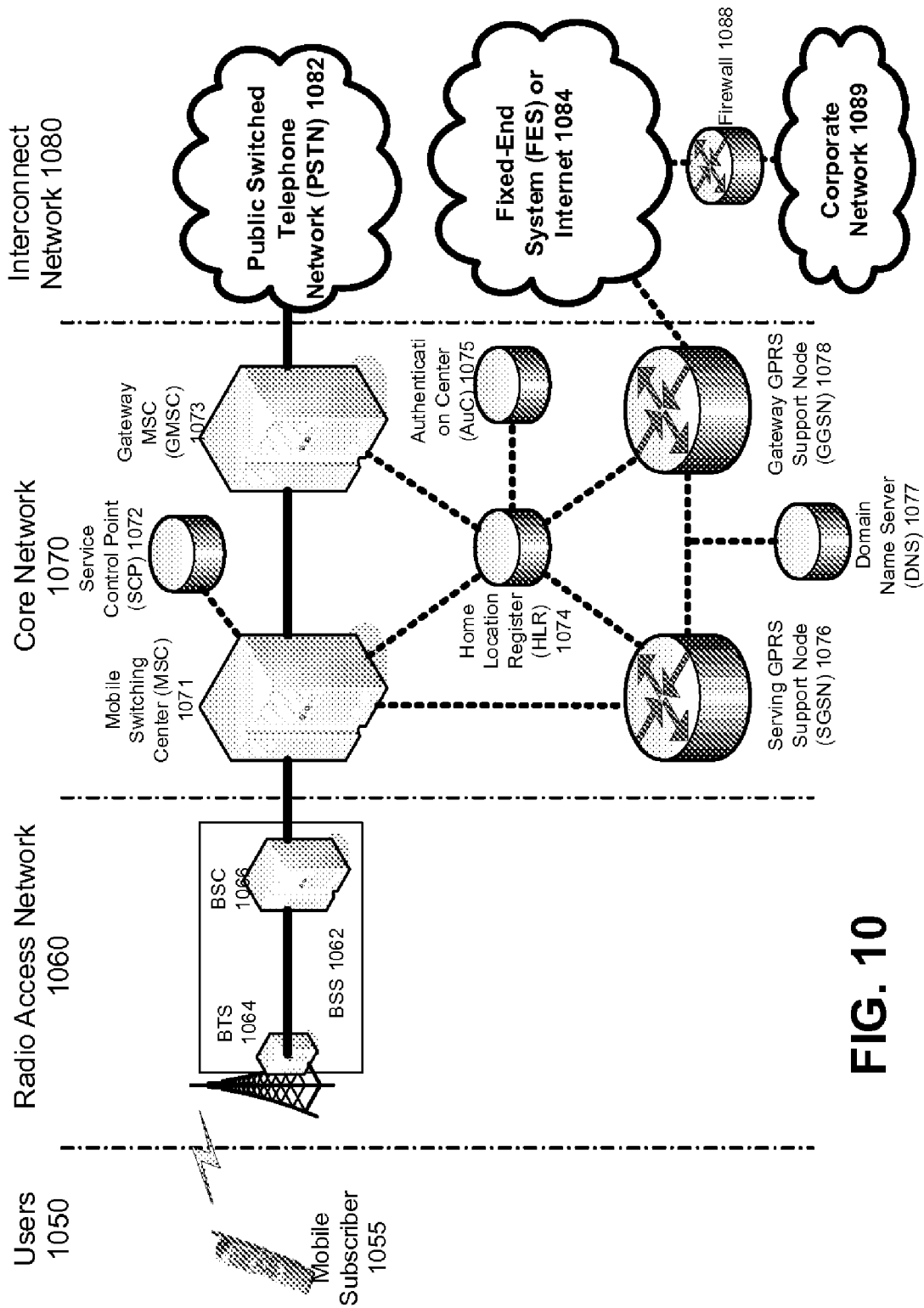
FIG. 10 illustrates a GPRS network architecture that may incorporate various aspects of the invention.

FIG. 10 illustrates the architecture of a typical GPRS network as segmented into four groups: users 1050, radio access network 1060, core network 1070, and interconnect network 1080. Users 1050 comprise a plurality of end users (though only mobile subscriber 1055 is shown in FIG. 10). Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center ("MSC") 1071, Service Control Point ("SCP") 1072, gateway MSC 1073, SGSN 1076, Home Location Register ("HLR") 1074, Authentication Center ("AuC") 1075, Domain Name Server ("DNS") 1077, and GGSN 1078. Interconnect network 1080 also comprises a host of various networks and other network elements. As illustrated in FIG. 10, interconnect network 1080 comprises Public Switched Telephone Network ("PSTN") 1082, Fixed-End System ("FES") or Internet 1084, firewall 1088, and Corporate Network 1089.

A mobile switching center can be connected to a large number of base station controllers. At MSC 1071, for instance, depending on the type of traffic, the traffic may be separated in that voice may be sent to Public Switched Telephone Network ("PSTN") 1082 through Gateway MSC ("GMSC") 1073, and/or data may be sent to SGSN 1076, which then sends the data traffic to GGSN 1078 for further forwarding.

When MSC 1071 receives call traffic, for example, from BSC 1066, it sends a query to a database hosted by SCP 1072. The SCP 1072 processes the request and issues a response to MSC 1071 so that it may continue call processing as appropriate.

The HLR 1074 is a centralized database for users to register to the GPRS network. HLR 1074 stores static information about the subscribers such as the International Mobile Subscriber Identity ("IMSI"), subscribed services, and a key for authenticating the subscriber. HLR 1074 also stores dynamic subscriber information such as the current location of the mobile subscriber. Associated with HLR 1074 is AuC 1075. AuC 1075 is a database that contains the algorithms for authenticating subscribers and includes the associated keys for encryption to safeguard the user input for authentication.

In the following, depending on context, the term "mobile subscriber" sometimes refers either to the end user and sometimes to the actual portable device used by an end user of the mobile cellular service. When a mobile subscriber turns on his or her mobile device, the mobile device goes through an attach process by which the mobile device attaches to an SGSN of the GPRS network. In FIG. 10, when mobile subscriber 1055 initiates the attach process by turning on the network capabilities of the mobile device, an attach request is sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 requests more information from mobile subscriber 1055. This information is used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 notifies the old SGSN, to which mobile subscriber 1055 was attached before, to cancel the location process for mobile subscriber 1055. HLR 1074 then notifies SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 then goes through the authentication process. In the authentication process, SGSN 1076 sends the authentication information to HLR 1074, which sends information back to SGSN 1076 based on the user profile that was part of the user's initial setup. The SGSN 1076 then sends a request for authentication and ciphering to mobile subscriber 1055. The mobile subscriber 1055 uses an algorithm to send the user identification (ID) and password to SGSN 1076. The SGSN 1076 uses the same algorithm and compares the result. If a match occurs, SGSN 1076 authenticates mobile subscriber 1055.

Next, the mobile subscriber 1055 establishes a user session with the destination network, corporate network 1089, by going through a Packet Data Protocol ("PDP") activation process. Briefly, in the process, mobile subscriber 1055 requests access to the Access Point Name ("APN"), for example, UPS.com (e.g., which can be corporate network 1079) and SGSN 1076 receives the activation request from mobile subscriber 1055. SGSN 1076 then initiates a Domain Name Service ("DNS") query to learn which GGSN node has access to the UPS.com APN. The DNS query is sent to the DNS server within the core network 1070, such as DNS 1077, which is provisioned to map to one or more GGSN nodes in the core network 1070. Based on the APN, the mapped GGSN 1078 can access the requested corporate network 1079. The SGSN 1076 then sends to GGSN 1078 a Create Packet Data Protocol ("PDP") Context Request message that contains necessary information. The GGSN 1078 sends a Create PDP Context Response message to SGSN 1076, which then sends an Activate PDP Context Accept message to mobile subscriber 1055.

Once activated, data packets of the call made by mobile subscriber 1055 can then go through radio access network 1060, core network 1070, and interconnect network 1080, in particular fixed-end system or Internet 1084 and firewall 1088, to reach corporate network 1089.

Thus, network elements that may implicate the functionality of the PMF in accordance with the invention may include but are not limited to Gateway GPRS Support Node tables, Fixed End System router tables, firewall systems, VPN tunnels, and any number of other network elements as may be required by a particular digital network, or dictated according to the above-described embodiments of the PMF of the invention.

Figure 11:
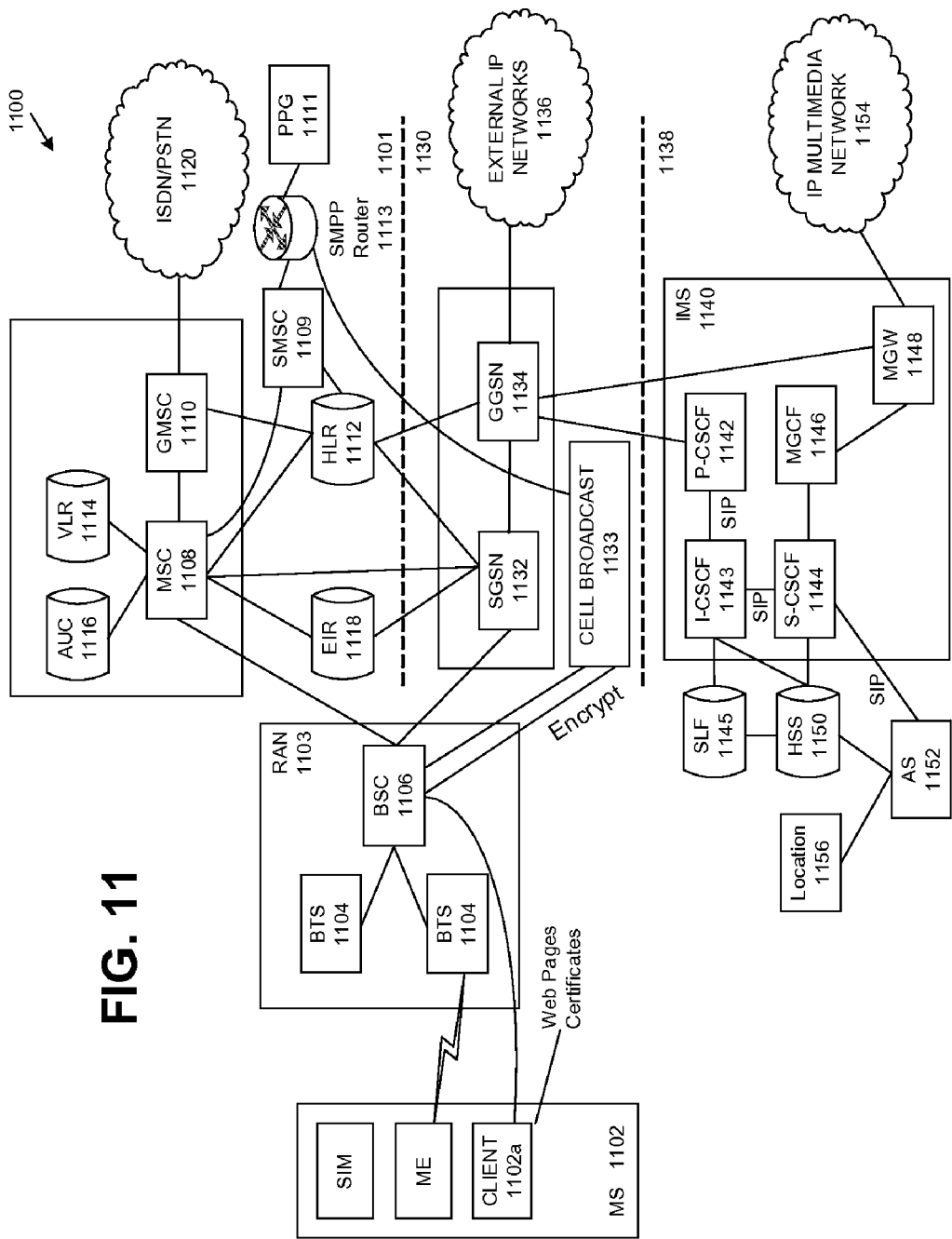
FIG. 11 illustrates an alternate block diagram of an exemplary GSM/GPRS/IP multimedia network architecture in which the invention may be employed.

FIG. 11 shows another exemplary block diagram view of a GSM/GPRS/IP multimedia network architecture 1100 in which the PMF of the present invention may be incorporated. As illustrated, architecture 1100 of FIG. 11 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 1104 is physical equipment, such as a radio tower, that enables a radio interface to communicate with the MS. Each BTS may serve more than one MS. The BSC 1106 manages radio resources, including the BTS. The BSC may be connected to several BTSs. The BSC and BTS components, in combination, are generally referred to as a base station (BSS) or radio access network (RAN) 1103.

The GSM core network 1101 also includes a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 performs a switching function for the network. The MSC also performs other functions, such as registration, authentication, location updating, handovers, and call routing. The GMSC 1110 provides a gateway between the GSM network and other networks, such as an Integrated Services Digital Network (ISDN) or Public Switched Telephone Networks (PSTNs) 1120. In other words, the GMSC 1110 provides interworking functionality with external networks.

The HLR 1112 is a database that contains administrative information regarding each subscriber registered in a corresponding GSM network. The HLR 1112 also contains the current location of each MS. The VLR 1114 is a database that contains selected administrative information from the HLR 1112. The VLR contains information necessary for call control and provision of subscribed services for each MS currently located in a geographical area controlled by the VLR. The HLR 1112 and the VLR 1114, together with the MSC 1108, provide the call routing and roaming capabilities of GSM. The AuC 1116 provides the parameters needed for authentication and encryption functions. Such parameters allow verification of a subscriber's identity. The EIR 1118 stores security-sensitive information about the mobile equipment.

A Short Message Service Center (SMSC) 1109 allows one-to-one Short Message Service (SMS) messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1102 sends a location update including its current location information to the MSC/VLR, via the BTS 1104 and the BSC 1106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1130 is logically implemented on the GSM core network architecture by introducing two packet-switching network nodes, a serving GPRS support node (SGSN) 1132, a cell broadcast and a Gateway GPRS support node (GGSN) 1134. The SGSN 1132 is at the same hierarchical level as the MSC 1108 in the GSM network. The SGSN controls the connection between the GPRS network and the MS 1102. The SGSN also keeps track of individual MS's locations and security functions and access controls.

A Cell Broadcast Center (CBC) 1133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1134 provides a gateway between the GPRS network and a public packet network (PDN) or other IP networks 1136. That is, the GGSN provides interworking functionality with external networks, and sets up a logical link to the MS through the SGSN. When packet-switched data leaves the GPRS network, it is transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 1138 was introduced with 3GPP Release 5, and includes an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM network 1101, the GPRS network 1130 as well as the IP multimedia network 1138.

The IP multimedia system 1140 is built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 forwards session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143, forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSS's 1150 are present. The S-CSCF 1144 performs the session control services for the MS 1102. This includes routing originating sessions to external networks and routing terminating sessions to visited networks. The S-CSCF 1144 also decides whether an application server (AS) 1152 is required to receive information on an incoming SIP session request to ensure appropriate service handling. This decision is based on information received from the HSS 1150 (or other sources, such as an application server 1152). The AS 1152 also communicates to a location server 1156 (e.g., a Gateway Mobile Location Center (GMLC)) that provides a position (e.g., latitude/longitude coordinates) of the MS 1102.

The HSS 1150 contains a subscriber profile and keeps track of which core network node is currently handling the subscriber. It also supports subscriber authentication and authorization functions (AAA). In networks with more than one HSS 1150, a subscriber location function provides information on the HSS 1150 that contains the profile of a given subscriber.

The MGCF 1146 provides interworking functionality between SIP session control signaling from the IMS 1140 and ISUP/BICC call control signaling from the external GSTN networks (not shown). It also controls the media gateway (MGW) 1148 that provides user-plane interworking functionality (e.g., converting between AMR- and PCM-coded voice). The MGW 1148 also communicates with other IP multimedia networks 1154.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While the present invention has been described in connection with the preferred embodiments of the various Figures, it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. Therefore, the present invention should not be limited to any single embodiment, but rather should be construed in breadth and scope in accordance with the appended claims.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Various implementations of the invention described herein may have aspects that are wholly in hardware, partly in hardware and partly in software, as well as in software. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The terms "article of manufacture", "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components, e.g., according to a hierarchical arrangement. Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIGS. 6 and 7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom.

While exemplary embodiments refer to utilizing the present invention in the context of particular programming language constructs, specifications or standards, the invention is not so limited, but rather may be implemented in any language to provide software and/or hardware to implement a PMF in accordance with the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method, comprising:
storing, in a centralized policy storage abstraction, a first policy relating to an internet protocol flow based services and a second policy relating to a non internet protocol flow based services;
managing the first policy and the second policy via a common management framework;
receiving a request for a service in a communications network;
handling the request for the service based on policy information retrieved from the centralized policy storage abstraction; and
exchanging a portion of the policy information with a disparate communications network for managing a converged service.

2. The method of claim 1, wherein the managing includes validating the first policy.

3. The method of claim 1, wherein the receiving includes receiving a request for the internet protocol flow based service via a policy control and charging rules function of a 3rd Generation Partnership Project Release 7 Policy and Charging Control Architecture.

4. The method of claim 1, wherein the receiving includes receiving a request for the non internet protocol flow based service and further comprising, communicating with a policy enabled policy enforcement point that includes a non internet protocol flow based network element, to facilitate the handling.

5. The method of claim 1, further comprising, retrieving the policy information referenced by the centralized policy storage abstraction.

6. The method of claim 5, wherein the retrieving includes retrieving a third policy pertaining to use of at least one network resource by the service and a fourth policy pertaining to use of the service.

7. The method of claim 5, wherein the receiving includes receiving the request from a visited communications network during roaming and the retrieving includes retrieving the policy information from a policy management server of a home communications network for the request by accessing a second central policy repository of the home communications network via a broker mechanism that dynamically maps a policy of the home communications network and the visited communications network information based on a service level agreement.

8. The method of claim 1, further comprising, dynamically negotiating a service level agreement between the communications network and a disparate communications network.

9. The method of claim 8, wherein the dynamically negotiating includes automatically determining, via a broker mechanism, the service level agreement between the communications network and the disparate communications network.

10. A non-transitory computer readable medium comprising computer executable instructions for performing the method of claim 1.

11. The method of claim 1, further comprising, providing a migration path for converging a localized policy function into the common management framework.

12. A system within a first communication network, comprising:
- a centralized policy management server configured to manage policies relating to different classes of services including a first policy for an internet protocol flow based service and a second policy for non internet protocol flow based service a, wherein the centralized policy management sever is further configured to support a converged service across disparate operator domains based on exchange of service policy data with a disparate centralized PMS of a second communications network;
- a centralized policy provisioning server configured to provision the policies via a common interface and is communicatively coupled to the centralized PMS; and
- a centralized policy data store configured to store the policies, and is communicatively coupled to the centralized policy management server and the centralized policy provisioning server.

13. The system of claim 12, wherein the centralized policy management server includes a policy control and charging rules function (PCRF) of a 3rd Generation Partnership Project Release 7 policy and charging control Architecture.

14. The system of claim 12, wherein the centralized policy data store includes a subscriber profile repository of a 3rd Generation Partnership Project Release 7 policy and charging control Architecture.

15. The system of claim 12, wherein the policies include a third policy pertaining to a network resource.

16. The system of claim 12, wherein the centralized policy provisioning server is further configured to resolve a policy conflict.

17. A method, comprising:
- receiving a request for a service converged across disparate operator domains;
- based on the request, negotiating policy information between a centralized policy management server associated with a first of the disparate operator domains and a disparate centralized policy management server associated with a second of the disparate operator domains;
- handling the request for service based on the policy information; and
- managing the policy information via a common interface utilized to manage policies relating to disparate classes of services.

18. The method of claim 17, further comprising, receiving a disparate request for an internet protocol flow based service via a policy control and charging rules function of a 3rd Generation Partnership Project Release 7 Policy and Charging Control Architecture, and retrieving disparate policy information from a subscriber profile repository of the 3rd Generation Partnership Project Release 7 Policy and Charging Control architecture.

19. The method of claim 17, further comprising, dynamically translating a policy associated with the first of the disparate operator domains from the home wireless communication network based on a service level agreement.

20. The method of claim 17, further comprising, receiving a disparate request for a non internet protocol flow based service associated with the second of the disparate operator domains and retrieving disparate policy information relating to the non internet protocol flow based service.

* * * * *